United States Patent

[11] 3,542,187

[72] Inventor Helmuth Assauer
  Wuppertal-Elberfeld, Germany
[21] Appl. No. 807,684
[22] Filed March 17, 1969
[45] Patented Nov. 24, 1970
[73] Assignee Kobo Kohler & Bovenkamp Gesellschaft
  mit beschrankter Haftung
  Wuppertal-Barmen, Germany

[54] CHIP CONVEYOR
  7 Claims, 9 Drawing Figs.
[52] U.S. Cl. .................................................. 198/225
[51] Int. Cl. ................................................ B65g 25/08
[50] Field of Search ...................................... 198/225,
  224, 223, 170

[56] References Cited
  UNITED STATES PATENTS
  624,826 5/1899 Krone .......................... 198/225X Primary Examiner—Hugo O. Schulz
Attorney—Woodhams, Blanchard and Flynn ABSTRACT: A chip conveyor having conveyor rods movable back and forth on a stationary guide rail mounted on the base of a conveyor trough. The conveyor rods are provided with pushing blades which occupy only a part of the trough cross section. The conveyor trough is provided with a curved portion which extends in the vertical direction and is also provided with a tapered straight portion which reduces in cross section and is positioned adjacent the entrance end of the curved portion. The conveyor includes a plurality of short hingedly connected coupling members provided in the curved portion of the conveyor trough, which coupling members are hingedly mounted on guide blocks slidable on the stationary rail. The curved portion of the conveyor trough is provided with a cover thereon and the cover and the sidewalls of the curved portion of the conveyor trough are each provided with holding blades thereon, which holding blades are pivotable inwardly toward the wall and the cover in the feeding direction of the conveyor.

Patented Nov. 24, 1970

3,542,187

INVENTOR.
HELMUTH ASSAUER
ATTORNEYS

INVENTOR.
HELMUTH ASSAUER

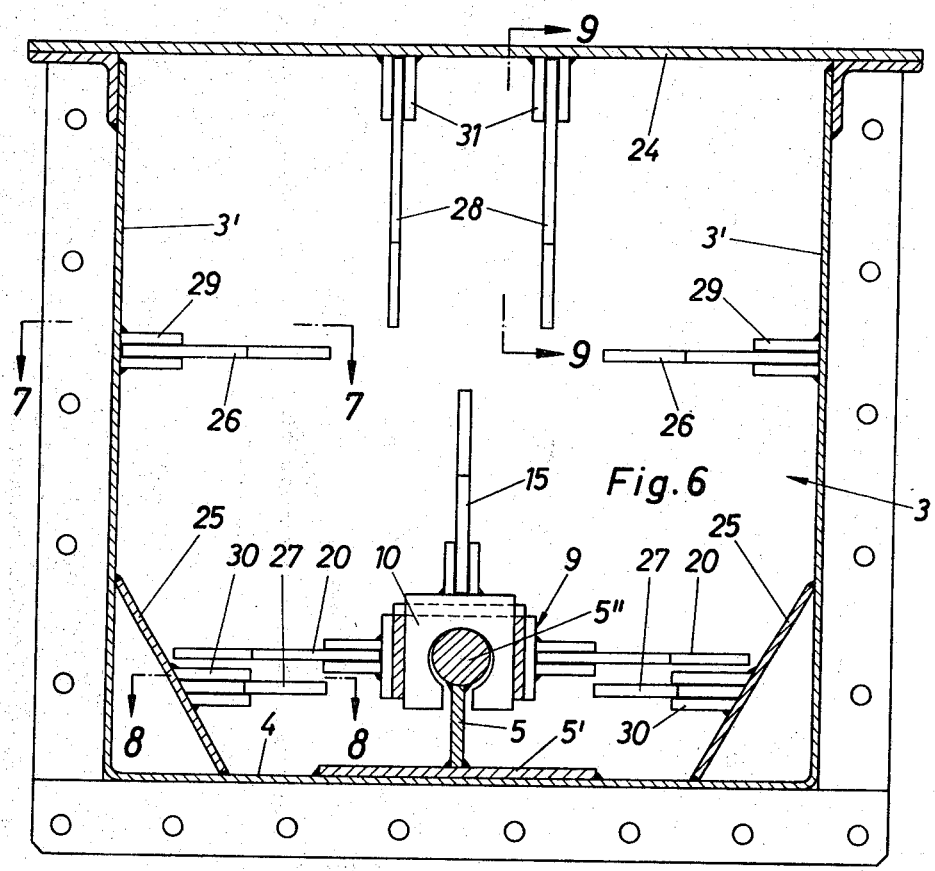
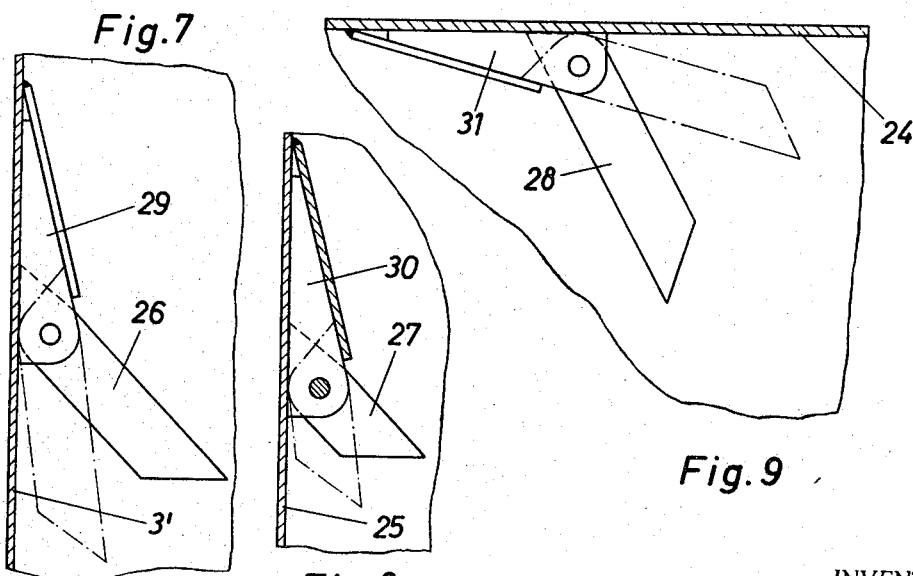

3,542,187

CHIP CONVEYOR

This invention relates to a chip conveyor comprising conveyor rods reciprocating or moving back and forth on the base of a conveyor trough, and sliding on stationary guides of the trough bottom, said rods being provided with pushing blades which fill only a part of the trough cross section and which, in the zone of a transition curve which is inclined in a vertical direction, are connected through shorter intermediate coupling members which are jointedly positioned in guide blocks.

Chip conveyors, as this is known, form huge transporting units which, by means of a horizontal conveyor section, transport large amounts of metal chips to a so-called crusher in which the curl-shaped chips are broken up into small pieces. These crushers are machines of large dimensions. As a rule it is necessary to place these crushers in pits below ground level so that the chips can be thrown into the machine immediately as they come from the conveyor. This construction is often not possible because of the space required and the expense involved, also for reasons of operational requirements, particularly in case of a later installation of chip conveyors.

It is already known to construct chip conveyors in such a manner that inclined conveyor sections can be installed. Short conveyor rods are in such case jointly connected on a section of a transition curve between a horizontal and an inclined conveyor trough so that they can follow an inclined portion of the conveyor trough. However, this procedure is not sufficient to allow a steep section with a short transition curve.

The basic purpose of the invention is to produce a chip conveyor which requires the least possible space and consists of simple and sturdy structural parts which makes it possible, in a short section with steeply inclined transition curves, or with steeply inclined conveyor sections, to obtain in spite of the inclination, a safe operation and a high conveyor output.

For this purpose, the conveyor trough which is covered on top is according to the invention tapered in cross section before the start of the transition curve and the trough wall and cover are provided with pivotable holding blades.

Due to the tapering in cross section at the entrance to the transition curve at first a certain concentration of the chips is obtained which not only results in a better transporting action but also overcomes great differences in height over a short distance. The accumulation of chips to be conveyed which forms at the inclined section is met by a larger number of pushing blades and the trough wall carries in relatively short intervals a correspondingly larger number of pivotable holding blades. Also, further holding blades can be provided on the cover. This results in a toothlike engagement so that the masses of chips are conveyed safely and with a rapid conveying action through the inclined section. Furthermore, the propelling of small chips is assured by the coherent masses of chips which cannot escape in the upward direction. Thus, no breakdowns occur.

A favorable interengaging relationship of the pushing blades and the holding blades is obtained according to the invention in that the holding blades which are arranged on the sidewalls and on the cover and the pushing blades of the conveyor rods all point toward the center zone of the trough and additional holding blades are provided on the sidewalls of the trough and are directed toward the conveyor rod.

In order to arrange the pushing blades in favorable short intervals and to make possible the use of steep inclination on the transition curve, without a lifting off and locking of the conveyor rod by the occurrence of a concentration of chips in said transition curve, a further embodiment of the invention provides that the intermediate coupling members of the conveyor rods are formed by short chain side bars which are connected in pairs by a head plate, which chain side bars carry by means of bearing ears pivotable, lateral pushing blades or pivotable pushing blades which are directed toward the cover of the conveyor trough.

In order to advantageously protect the pushing blades underneath the chip masses for the purpose of an undisturbed free movability, the jointed ends of the lateral, pivotable pushing blades and the pushing blades directed toward the cover are covered by protective plates.

In order to achieve the desired collapsed position, the protective plates of the pivotable pushing blades can advantageously, according to the invention, form the stops for the collapsing movement of same.

If, furthermore, according to the invention, the pushing blades directed toward the cover are arranged in an offset manner to the lateral pushing blades, there is obtained a free and effective changing of the blade engagement and there is further obtained a smooth, nonreversing advancement of the chips.

The invention is illustrated in one embodiment in the drawings, in which.

Figure 5:
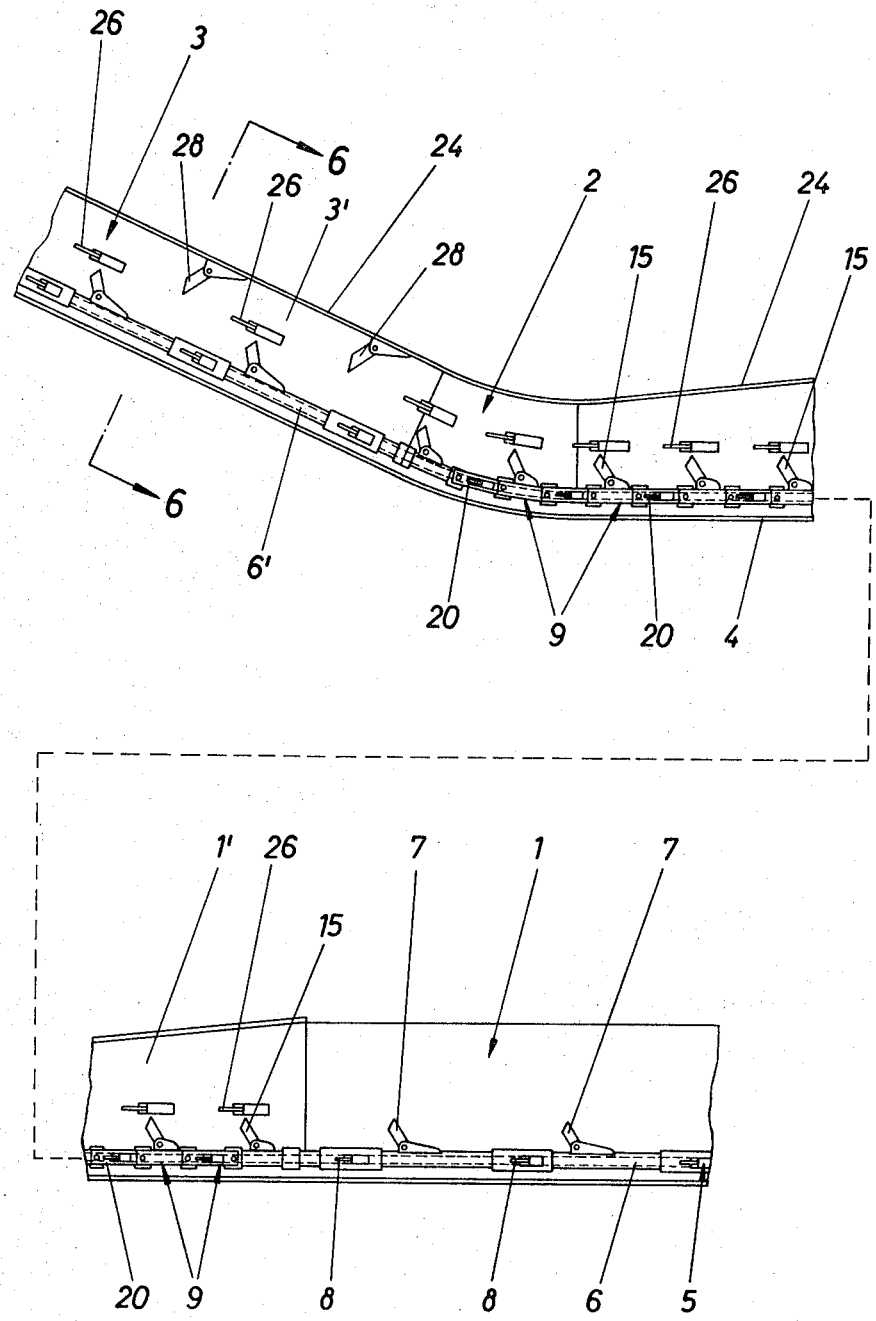

FIG. 5 schematically illustrates the construction of the trough of the chip conveyor of the invention at the transition curve with a conveyor section which is inclined in the vertical direction;

FIG. 6 is a cross-sectional view of the conveyor trough according to line 6–6 of FIG. 5;

FIG. 7 is a partial cross-sectional view of a detail along the line 7–7 of FIG. 6;

FIG. 8 is a partial cross-sectional view of a detailed along the line 8–8 of FIG. 6; and FIG. 9 is a further partial cross-sectional view along the line 9–9 of FIG. 6. The section of a chip conveyor illustrated in FIG. 5 essentially consists of the horizontal conveyor trough 1, a trough section 1' which is reduced in its cross section in comparison to the cross section of the horizontal section of the trough 1, the transition section 2 and the inclined section 3. The conveyor trough 1 is conventionally open at its upper side but the trough section 1', the transition curve 2 and the inclined section 3 are closed by a cover 24.

A back and forth moving conveyor rod 6 which slides on a stationary guide rail 5 is arranged on the base or the bottom wall 4 of the trough section 1 or 3. The conveyor rod 6 comprises pushing blades 7 and 8 which take up only a portion of the trough cross section.

The guide rail 5 extends uniformly along the inclined transition curve 2. The conveyor rod 6 is continued in the zone of said vertically oriented transition curve 2. A straight conveyor rod 6' is again connected to the end of the transition curve 2. The number of intermediate coupling members 9 within transition section 1' and transition curve 2 is determined corresponding to the stroke of the conveyor rod so that the flexibility of the conveyor rod section which is formed by the intermediate coupling members 9 is fully achieved during the movement thereof.

Figure 4:
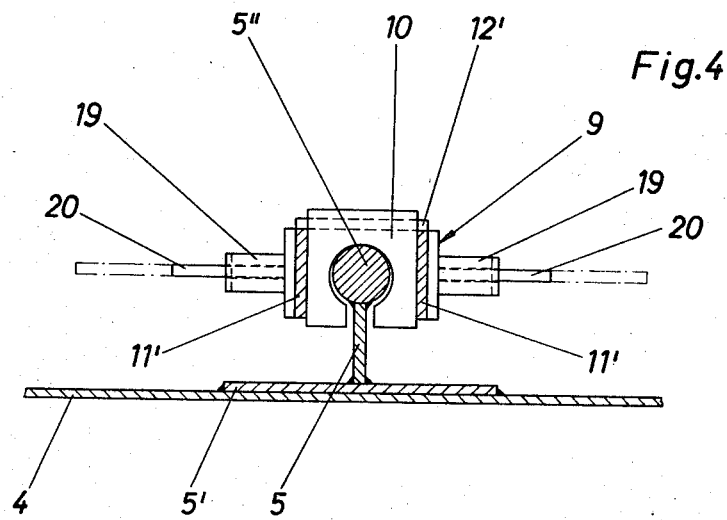
FIG. 4 is a cross-sectional view along the line 4–4 of FIG. 1.

The guide rail 5 is secured to the bottom 4 of the conveyor trough 1 by the mounting plate 5'. The rail head 5" has a circular cross section (FIGS. 4 or 6). The guide blocks 10 are slideably positioned on the rail head 5".

Figure 1:
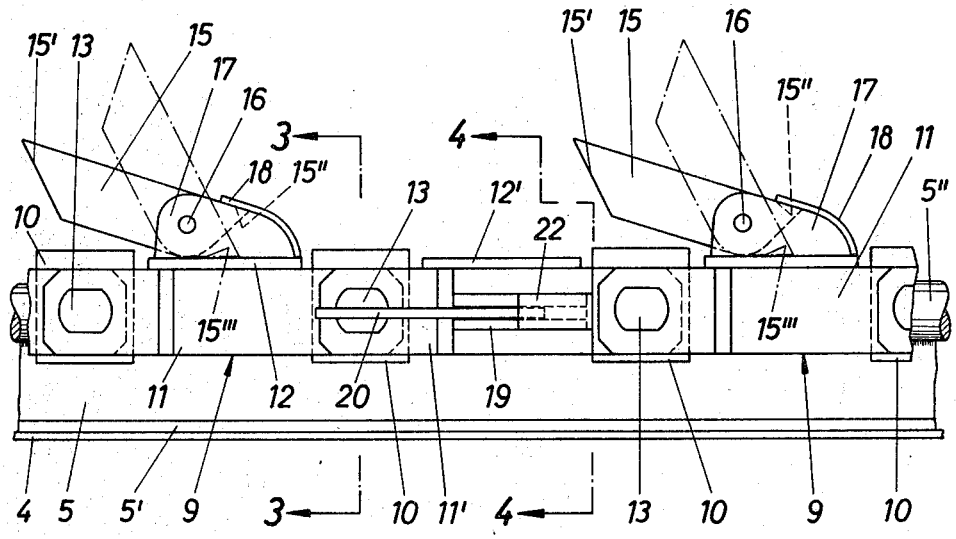
FIG. 1 is a longitudinal view looking toward the conveyor rods of a portion of the chip conveyor for use with a transition curve, said curve comprising several linked intermediate coupling members constructed according to the invention.
Figure 2:
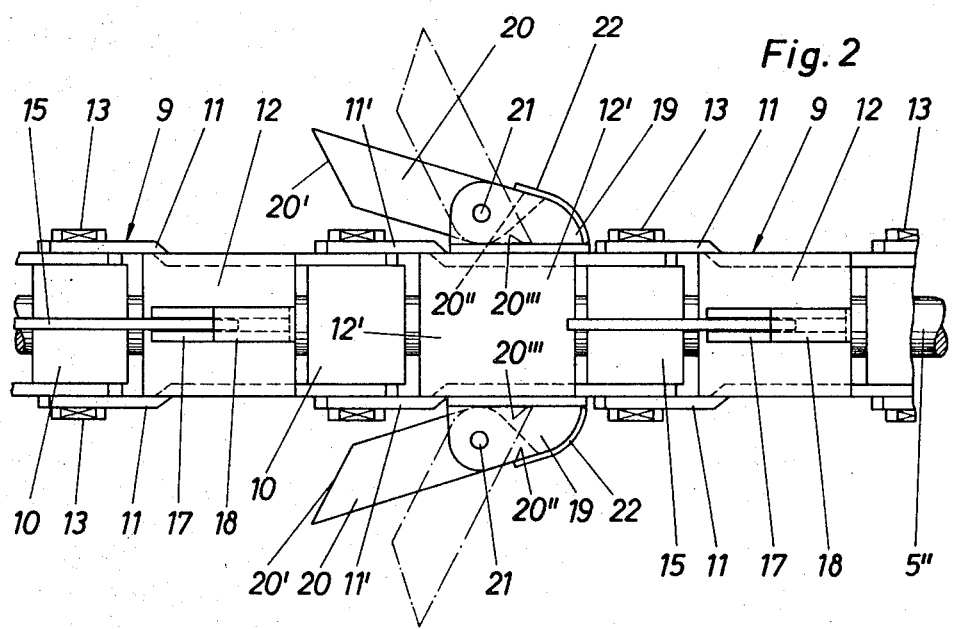
FIG. 2 is a top view of FIG. 1.

The intermediate coupling members 9 are formed by chainlike side bars 11 (FIGS. 1 and 2) which are comprised of flat, offset single members and each two oppositely positioned chain side bars are connected on a portion of their length by means of a common head plate 12 to form one chain member.

Figure 3:
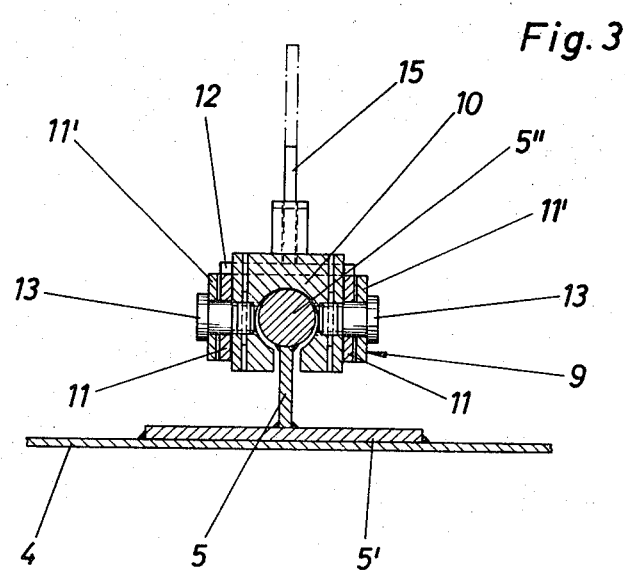
FIG. 3 is a cross-sectional view along the line 3–3 of FIG. 1.

The ends of the chainlike side bars 11 of the intermediate coupling members 9 form a chain joint and are supported on the guide blocks 10 by means of joint bolts 13 (FIG. 3).

A vertically pivotable pushing blade 15 which can be directed toward the cover is provided in any desired arrangement, if necessary interchangeably with intermediate coupling members of another construction, on each head plate 12 of the intermediate coupling members 9 in a conveyor section.

Said pushing blade 15 is supported movably about the pivot 16 (FIG. 1) on the ear 17 which is secured to the head plate 12. The slot of the ear is covered by a protective plate 18 which is used as a stop for the end 15'' of the blades 15 when in the pivoted-in position. The pushing blades 15 can move freely into the position indicated in dash-dotted lines and have an edge 15' which is inclined toward the top. In this pivoted-out position (FIG. 1), the blades are supported with their edge 15''' against the head plate 12 which extends under the ear 17.

Another construction of the intermediate coupling member consists of a pair of chainlike side bars 11' which are also combined with a head plate 12' to form a chain member. Bearing ears 19 are provided on the outside of the side bars 11' for laterally pivotable pushing blades 20. Same are secured by pivots 21. The slot of the ear 19 is also covered by a protective plate 22 so that the pushing blades 20 are also supported through their edge 20'' against the protective plate 22 when in the pivoted-in position and, when in the pivoted-out position, are supported with the inclined edge 20''' on the supporting side bar 11'. Thus, the pushing blades 20 can also move freely if suitable forces act on the edge 20' of the blades.

The conveyor trough comprises, according to FIG. 6, trough sections which are manufactured in so-called shots and the sidewalls 3 of which are united through the bottom 4 of the trough.

The guide rail 5 is provided on the bottom 4 of the trough sections. A trough-shaped cross section is achieved by means of inclined installed guiding walls 25. Holding blades 26, 27 are arranged in a suitable position both on the sidewall 3' and also the guiding walls 25. Said holding blades are freely movably pivotably supported on stationary ears 29, 30 and face in the feed direction. The holding blades swing, as this is illustrated in FIGS. 7—8, from the position illustrated in full lines to the position illustrated in dash-dotted lines. The free ends of the blades are of an acute shape; on the other side of the joint pivot the holding blades form stop edges for their backward and also forward pivoted position.

At the trough section with the tapered cross section, which trough section is positioned before the transition curve and also at the inclined section, the trough is rigidly connected on its upper side to the cover plate 24. Holding blades 28 which are also pivotable are arranged in the same manner above the inclined section and are of the same construction as above described, being pivotally mounted on ears 31 on the trough cover plate 24.

The operation of the above-described chip conveyor system is as follows:

The common conveyor structure which is provided on a horizontal conveyor section and which consists of the conveyor rod 6, feeds or moves forwardly, chips and balls of chips in a known manner so that during forward movement the chip balls are engaged in a barblike manner by the blades of the conveyor rods and are carried along whereby the small chips and possible core pieces are also engaged. During the return movement of the structure the chips, due to their weight and their friction, remain stationary in the trough. The conveyor rods return and then again move forward taking along the chips for another step. The pivotability of the pushing blades 15 or 20 in feed direction results in a self-acting or automatic spreading of the blades during forward conveyor movement, while movement in the return direction results in a pulling in of the blades.

In the inclined conveyor section, as illustrated in FIG. 5, the straight guide rail 5 merges into a curved rail section, the so-called transition curve. The conveyor structure consists in this section of the shorter intermediate coupling members 9, namely, in a section which corresponds in its length at least to the forward stroke length or movement of the conveyor structure.

Both the transition curve 2 of the conveyor trough and also its inclined section 3 are provided with pivotable holding blades 26, 27. Further holding blades 28 are also preferably arranged on the cover 24 in the inclined section 3.

The pushing blades 15 and the horizontally pivotable holding blades 26 of the trough are used interchangeably throughout the entire length of the conveyor section 1', 2 and 3.

The trough section 1' effects at the entrance to the transition curve a certain concentration of the chips due to a reduction of the cross section which results in a better transporting action on the inclined section.

During the back and forth movement of the conveyor, the balls of chips are first during the forward movement dragged over several holding blades 26, 27 which thereby swing into the position illustrated in dash-dotted lines in FIGS. 7, 8 and 9. As soon as the conveyor structure moves backward and the chips follow in said movement, the stationary holding blades 26, 27 and 28 which are provided on the conveyor trough swing out, penetrate into the balls of chips and hold same. The pushing blades 15 and 20 of the intermediate coupling members 9 are released (and swing in) and with the conveyor structure pass by several holding blades 26, 27 and 28 without a catching action and move back to their initial position.

This results in a satisfactory conveying of the chips which form balls particularly easily in front of the inclination section. Also due to the concentration of the balls of chips, a conveying of the small chips on the inclined section is easily assured because, since the trough is covered, the balls of chips cannot shunt.

Although a particular preferred embodiment of the invention has been disclosed above for illustrative purposes, it will be understood that variations or modifications thereof which lie within the scope of the appended claims are fully contemplated.

I. claim:

1. A chip conveyor comprising conveyor rods moving back and forth on the base of a conveyor trough and sliding on stationary guides on the trough bottom, said rods being provided with pushing blades which fill out only a part of the trough cross section and which, in the zone of a transition curve which is inclined in the vertical direction, are connected through shorter intermediate coupling members which are hingedly connected on guide blocks, the conveyor trough being covered on top and tapered in cross section before the start of the transition curve, and the trough wall and the cover having holding blades pivotable inwardly in the feed direction.

2. A chip conveyor according to claim 1, wherein the holding blades are arranged on the sidewalls and on the cover and the pushing blades of the conveyor rods point to the center zone of the trough, and additional holding blades are directed toward the conveyor rod and are provided on the sidewalls of the trough.

3. A chip conveyor according to claim 1, wherein the intermediate coupling members of the conveyor rods are formed by short chainlike side bars which are connected in pairs by a head plate, which chainlike side bars carry by means of bearing ears pivotable laterally extending blades and pivotable blades directed toward the trough cover.

4. A chip conveyor according to claim 1, wherein the inner ends of the pivotable pushing blades are covered by protective plates.

5. A chip conveyor according to claim 4, wherein the protective plates of the pivotable pushing blades form the stops for the pivoting-in movement of same.

6. A chip conveyor according to claim 3, wherein the pushing blades directed toward the cover are arranged in an offset manner relative to the lateral pushing blades.

7. A conveyor for moving material in a forward direction from a first position to a second position, comprising:
a trough-shaped conveyor housing extending between said first and second positions, said housing including a curved portion which extends in the vertical direction and a straight tapered portion which reduces in cross section in said forward direction and is connected at its reduced end to the entrance end of the curved portion;
a cover fixedly secured to said trough-shaped housing and extending longitudinally at least throughout the length of the tapered portion and the curved portion;

a stationary guide rail fixedly positioned within said housing and fixedly secured to the bottom wall thereof, said guide rail extending longitudinally of said housing between said first and second positions, said guide rail including a substantially straight rail portion extending through the tapered portion of said housing and a curved rail portion extending through the curved portion of said housing;

conveyor means positioned with said housing and slidably mounted on said guide rail for back and forth movement relative thereto, said conveyor means extending longitudinally of said housing between said first and second positions, said conveyor means being provided with a plurality of pivotable pushing blades which are axially and radially spaced relative to said rail and which extends outwardly so as to occupy a portion of the trough cross section, said blades being pivotal between a first position wherein the blades are folded inwardly and extend in said forward direction relative to said rail and a second position wherein the blades extend substantially outwardly from the sides of said rail;

said conveyor means further including a plurality of guide blocks slidably mounted on the curved rail portion and a plurality of coupling members hingedly connecting adjacent guide blocks, the portion of the conveyor means located within the curved portion of the housing also being provided with pivotable pushing blades mounted thereon; and holding means secured to the tapered portion and the curved portion of said housing for maintaining the material in an advanced position and preventing reverse flow thereof toward said first position, said holding means comprising a plurality of holding blades pivotally mounted on the cover and on the opposite sidewalls of the tapered and curved portions of the housing, said holding blades extending inwardly into the cross section of the trough and being pivotal between a first position wherein the blades are folded and lie adjacent their respective walls and extend in the forward direction and a second position wherein the blades extend outwardly toward the central portion of the trough cross section to prevent reverse flow of material.